(12) United States Patent
Shimoda et al.

(10) Patent No.: US 9,361,687 B2
(45) Date of Patent: Jun. 7, 2016

(54) APPARATUS AND METHOD FOR DETECTING POSTURE OF CAMERA MOUNTED ON VEHICLE

(75) Inventors: Kenichi Shimoda, Iwaki (JP); Hisayuki Watanabe, Iwaki (JP); Kazuhiro Hiruta, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 713 days.

(21) Appl. No.: 13/489,835

(22) Filed: Jun. 6, 2012

(65) Prior Publication Data

US 2012/0314073 A1    Dec. 13, 2012

(30) Foreign Application Priority Data

Jun. 13, 2011   (JP) .................................. 2011-131323

(51) Int. Cl.
*H04N 7/18*    (2006.01)
*G06T 7/00*    (2006.01)

(52) U.S. Cl.
CPC ..... *G06T 7/0018* (2013.01); *G06T 2207/30204* (2013.01); *G06T 2207/30244* (2013.01); *G06T 2207/30252* (2013.01)

(58) Field of Classification Search
CPC .............. B60R 1/00; B60R 2300/105; B60R 2300/205; B60R 2300/302; B60R 11/04; B60R 2022/208; B60R 21/013; B60R 21/0134; B60R 21/0152; B60R 21/01534; B60R 21/01536; B60R 21/01538; B60R 21/0154
USPC ......................................................... 348/148
See application file for complete search history.

(56) References Cited

U.S. PATENT DOCUMENTS

| 7,307,655 B1 | 12/2007 | Okamoto et al. |
| 2007/0031001 A1 * | 2/2007 | Hamanaka .................... 382/103 |
| 2008/0205706 A1 | 8/2008 | Hongo |
| 2009/0154770 A1 | 6/2009 | Akiyama |
| 2009/0290032 A1 | 11/2009 | Zhang et al. |

(Continued)

FOREIGN PATENT DOCUMENTS

| CN | 201576093 U   * | 9/2010 |
| EP |   2233357 A2   | 9/2010 |

(Continued)

OTHER PUBLICATIONS

European Search Report for co-pending European Patent Application No. 12171485.1 dated Nov. 21, 2013.

(Continued)

*Primary Examiner* — Farzana Hossain
(74) *Attorney, Agent, or Firm* — Brinks Gilson & Lione

(57) ABSTRACT

An in-vehicle camera posture detecting apparatus includes a first image storing unit configured to store an image of a calibration sheet placed near the vehicle, the calibration sheet having a plurality of calibration marks, a first posture estimating unit for estimating the posture of the camera based on the first image, a second image storing unit that stores an image of the calibration sheet after movement of the vehicle, a second posture estimating unit that estimates the posture of the camera based on the second image, a sheet deviation calculating unit that calculates an amount of deviation of the calibration sheet from a predetermined position based on the estimates provided by the first and second posture estimating units, and a camera posture determining unit that determines the posture of the camera based on a posture estimated value and the calculated amount of deviation.

11 Claims, 8 Drawing Sheets

(56) References Cited

U.S. PATENT DOCUMENTS

| | | | |
|---|---|---|---|
| 2010/0082281 A1* | 4/2010 | Nakamura | G06T 7/0018 702/95 |
| 2010/0085170 A1* | 4/2010 | Oleg | B60R 1/00 340/425.5 |
| 2010/0238291 A1* | 9/2010 | Pavlov | B60R 11/04 348/148 |
| 2010/0245575 A1* | 9/2010 | Mori | B60R 1/00 348/148 |
| 2010/0246901 A1 | 9/2010 | Yang | |
| 2010/0253784 A1* | 10/2010 | Oleg | 348/187 |

FOREIGN PATENT DOCUMENTS

| | | |
|---|---|---|
| JP | 2008-205811 | 9/2008 |
| JP | 2008-219063 | 9/2008 |
| JP | 2010-183265 | 8/2010 |
| JP | 2010-188765 | 9/2010 |
| JP | 2010-233079 | 10/2010 |
| JP | 2011-047725 | 3/2011 |
| WO | WO 2007/142267 | 12/2007 |
| WO | WO 2009/066506 | 5/2009 |
| WO | WO 2010/038224 A1 | 4/2010 |

OTHER PUBLICATIONS

Office Action from Japanese Patent Office dated Dec. 16, 2014 with English translation.
Response to Office Action dated Dec. 24, 2015 issued by the JPO for related Japanese Application No. 2011-131323 (English translation of the relevant portion attached).
Decision for Refusal dated May 12, 2015 issued by JPO for related Japanese Application No. 2011-131323 (English translation attached).
Demand for Appeal dated Jun. 16, 2015 for related Japanese Application No. 2011-131323 (English translation attached).

\* cited by examiner

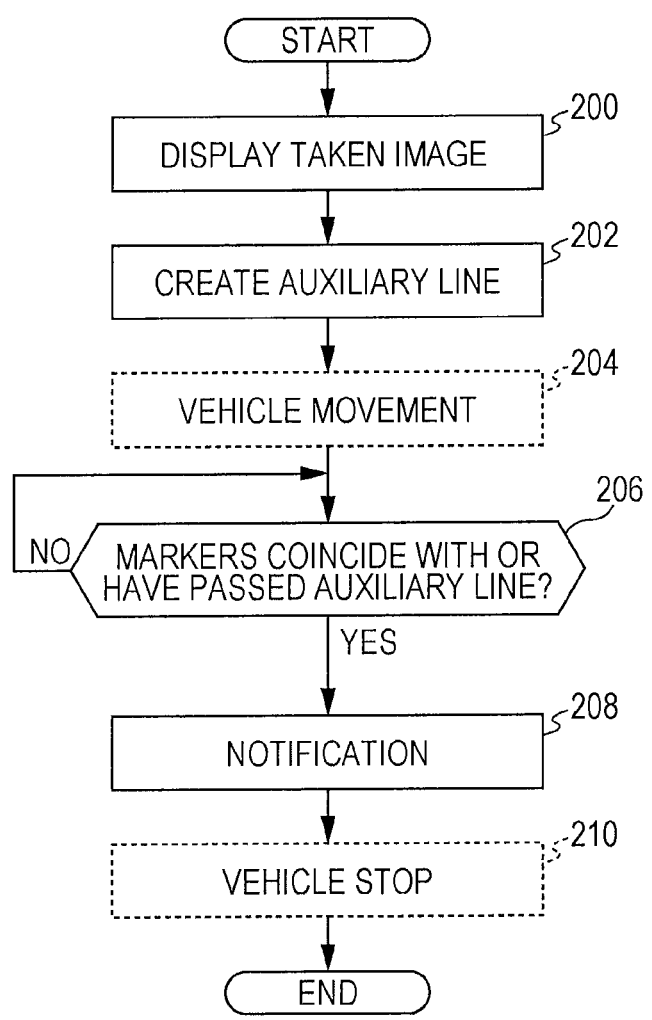

APPARATUS AND METHOD FOR DETECTING POSTURE OF CAMERA MOUNTED ON VEHICLE

PRIORITY CLAIM

This application claims the benefit of Japanese Patent Application No. 2011-131323, filed on Jun. 13, 2011, and which is incorporated by reference herein in its entirety.

BACKGROUND

1. Field of the Invention

The present invention relates to an in-vehicle camera posture detecting apparatus and method for detecting an installation angle and the like of a camera that is mounted on a vehicle and captures an image of surroundings of the vehicle.

2. Description of the Related Art

In order to accurately detect the position or size of a subject included in an image captured by a camera mounted on a vehicle on the basis of the image, or in order to combine images of adjacent regions captured by cameras such that the resultant image is seamless, the installation position and angle of the camera or each camera have to be accurately determined.

The installation position and angle of a typical camera are often predetermined upon design of a system including the camera. Since an installation error is actually caused, calibration is performed after installation and the installation position and angle are then detected. For example, a camera installation angle calculating method has been known by which the installation position and angle of a camera are detected on the basis of images of a calibration sheet captured through the camera, the calibration sheet being placed in a predetermined position near a vehicle and having a printed calibration pattern including a plurality of calibration marks (refer to Japanese Unexamined Patent Application Publication No. 2010-183265 (pp. 2-11, FIGS. 1 to 23), for example).

The above-described method assumes that the calibration sheet is accurately placed in the predetermined position. Disadvantageously, if the placed calibration sheet is deviated from the predetermined position, the posture (position and angle) of the camera will fail to be accurately detected. For example, it is assumed that the calibration sheet is placed on the ground at the rear of the vehicle such that the placed calibration sheet is aligned with one end of a rear bumper and an image of the calibration sheet is captured by the camera installed in the rear of the vehicle. Although the position of the calibration sheet is positioned in that manner, it is difficult to align the calibration sheet with the end of the rear bumper, since the rear bumper is spaced apart from the ground. The same applies to the positions of the right and left sides of the calibration sheet. It is also difficult to accurately align the middle of the vehicle along the width thereof with the middle of the calibration sheet in the direction along the width of the vehicle.

SUMMARY

The present invention has been made in consideration of the above-described circumstances. It is an object of the present invention to provide an in-vehicle camera posture detecting apparatus and method capable of accurately detecting the posture of a camera.

According to an aspect of the present invention, an in-vehicle camera posture detecting apparatus for detecting the posture of a camera mounted on a vehicle on the basis of images of a plurality of calibration marks included in a calibration sheet placed near the vehicle, the images being captured through the camera, includes the following elements. A first image storing unit stores, as a first image, an image of the calibration sheet captured through the camera. A first posture estimating unit estimates the posture of the camera on the basis of the first image stored in the first image storing unit. A second image storing unit stores, as a second image, an image of the calibration sheet captured through the camera after movement of the vehicle by a predetermined distance. A second posture estimating unit estimates the posture of the camera on the basis of the second image stored in the second image storing unit. A sheet deviation calculating unit calculates the amount of deviation of the calibration sheet from a predetermined position on the basis of estimations by the first and second posture estimating units. A camera posture determining unit determines the posture of the camera on the basis of a posture estimated value obtained by at least one of the first and second posture estimating units and the deviation amount calculated by the sheet deviation calculating unit.

According to another aspect of the present invention, a method for detecting the posture of a camera mounted on a vehicle on the basis of images of a plurality of calibration marks included in a calibration sheet placed near the vehicle, the images being captured through the camera, includes estimating, by a first posture estimating unit, the posture of the camera on the basis of an image of the calibration sheet captured through the camera, estimating, by a second posture estimating unit, the posture of the camera on the basis of an image of the calibration sheet captured through the camera after movement of the vehicle by a predetermined distance, calculating, by a sheet deviation calculating unit, the amount of deviation of the calibration sheet from a predetermined position on the basis of estimations by the first and second posture estimating units, and determining, by a camera posture determining unit, the posture of the camera on the basis of a posture estimated value obtained by at least one of the first and second posture estimating units and the deviation amount calculated by the sheet deviation calculating unit.

Since the amount of deviation of the calibration sheet from the predetermined position (design position, also referred to default position) is calculated on the basis of the images captured before and after movement of the vehicle, the effect of the deviation of the calibration sheet can be eliminated. Thus, the posture of the camera can be accurately detected.

Preferably, the predetermined distance by which the vehicle is moved is calculated on the basis of posture estimated values obtained by the first and second posture estimating units. Consequently, the distance of movement of the vehicle can be accurately grasped, thus reducing an error in the estimated posture of the camera based on the second image.

Preferably, the sheet deviation calculating unit assumes that the camera is installed in a design position and calculates the deviation amount on the basis of the relationship between the design position of the camera, the estimations by the first and second posture estimating units, and the deviation amount of the calibration sheet from the predetermined position. Since the design position of the camera and posture estimated values are known values in this relationship, the deviation amount which is remaining can be calculated.

Preferably, the camera posture determining unit determines an actual camera angle on the basis of the relationship between camera angles estimated by the first and second posture estimating units, and a component in the direction of rotation of the deviation amount of the calibration sheet calculated by the sheet deviation calculating unit. Since the estimated camera angles and the component in the direction of rotation of the deviation amount of the calibration sheet are known values, the actual camera angle which is remaining can be calculated.

Preferably, the camera posture determining unit determines the posture of the camera on the basis of a posture estimated value obtained by the first posture estimating unit. An error caused upon determination of the posture of the camera can be reduced, since an estimated value obtained using the calibration sheet placed near the vehicle is used.

Preferably, the vehicle is moved straight. In the case where images of the calibration sheet are captured before and after movement, the amount of deviation in the direction of rotation of the calibration sheet can be kept constant. The number of parameters to be calculated can therefore be reduced. Thus, processing can be simplified.

The apparatus may further include a display processing unit that displays a check image on a display, the check image being used to determine whether the vehicle has been moved by the predetermined distance. Accordingly, a driver of the vehicle can move the vehicle while viewing the check image. It is therefore easy to move the vehicle by the predetermined distance.

Preferably, the check image includes a marker that moves in the check image as the vehicle is moved and an auxiliary line whose display position is fixed in the check image. The check image may be displayed such that the marker coincides with the auxiliary line at the timing when the movement of the vehicle by the predetermined distance is completed. Alternatively, the apparatus may further include a movement completion determining unit that determines on the basis of images captured through the camera whether the movement of the vehicle by the predetermined distance is completed and provides a predetermined notification on completion of the movement. Accordingly, the driver can be reliably notified of the movement of the vehicle by the predetermined distance. Thus, the distance of movement of the vehicle can be prevented from becoming longer than necessary.

BRIEF DESCRIPTION OF THE DRAWINGS

FIG. 8 is a flowchart of a procedure for providing a notification on completion of movement of the vehicle by a predetermined distance according to a modification of the embodiment.

DETAILED DESCRIPTION

An in-vehicle camera posture detecting apparatus according to an embodiment of the present invention will be described below with reference to the drawings.

Figure 1:
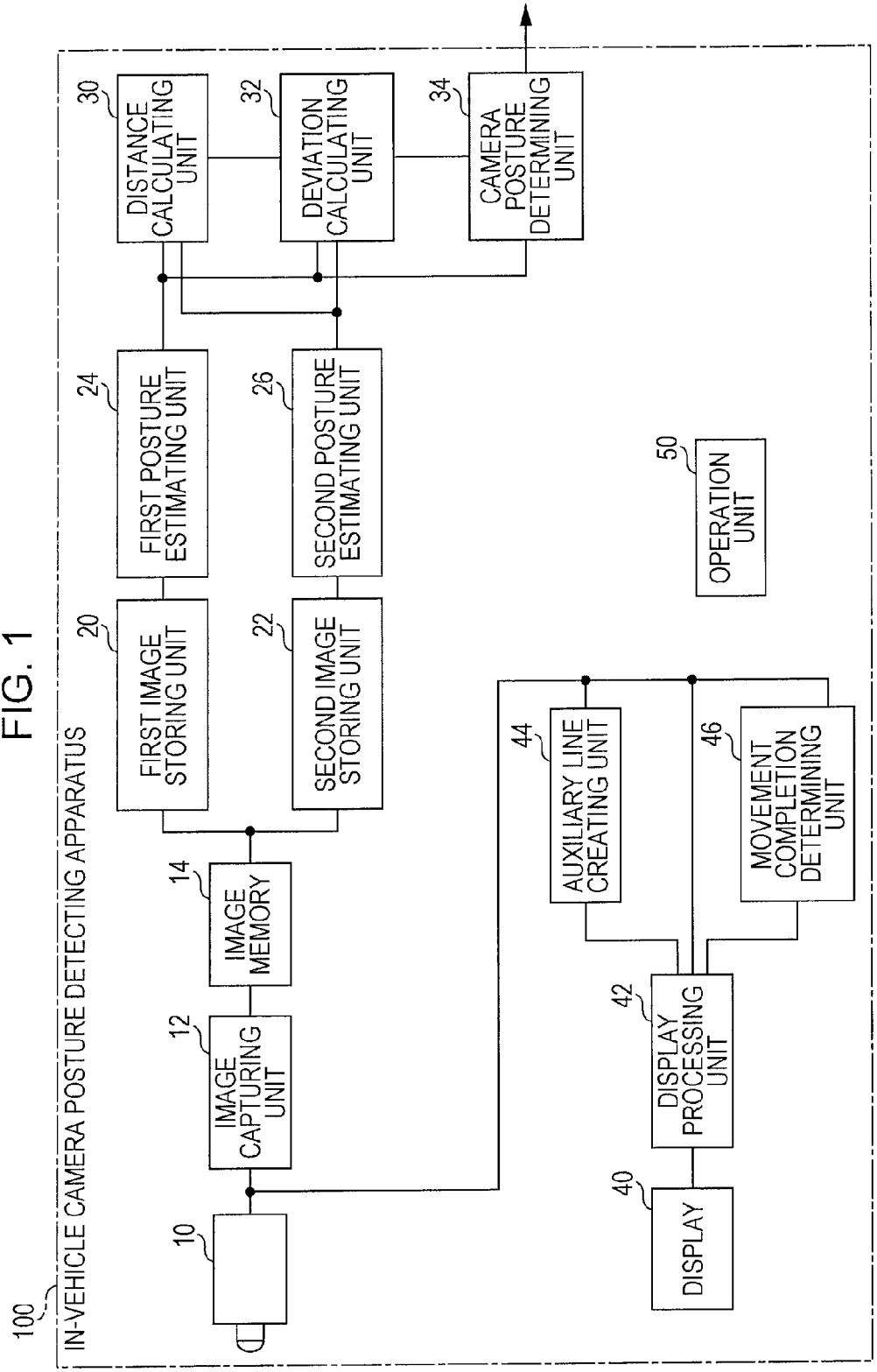
FIG. 1 is a block diagram of the configuration of an in-vehicle camera posture detecting apparatus according to an embodiment of the present invention.

FIG. 1 illustrates the configuration of the in-vehicle camera posture detecting apparatus according to the embodiment. Referring to FIG. 1, the in-vehicle camera posture detecting apparatus, indicated at 100, according to the embodiment includes a camera 10, an image capturing unit 12, an image memory 14, a first image storing unit 20, a second image storing unit 22, a first posture estimating unit 24, a second posture estimating unit 26, a distance calculating unit 30, a deviation calculating unit 32, a camera posture determining unit 34, a display 40, a display processing unit 42, an auxiliary line creating unit 44, a movement completion determining unit 46, and an operation unit 50. The camera, whose posture is detected by the in-vehicle camera posture detecting apparatus 100, is to be used in another apparatus such that the other apparatus uses a result of detection by the camera. The components of the in-vehicle camera posture detecting apparatus 100 may be included in the other apparatus.

Figure 2:
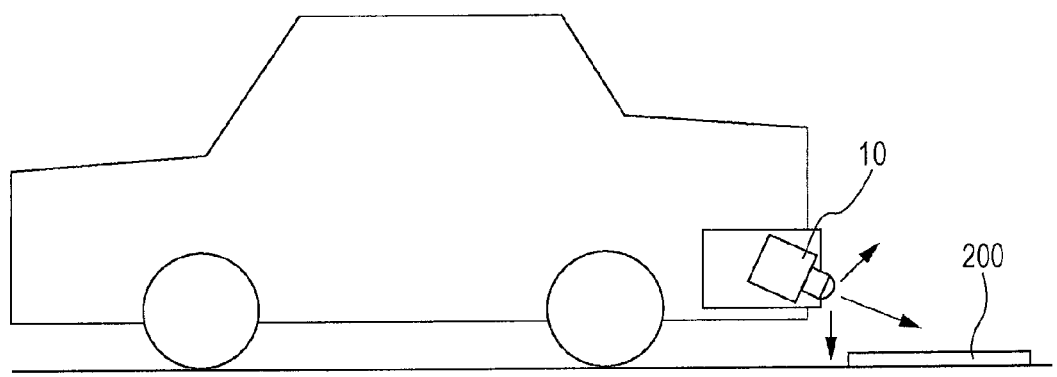
FIG. 2 is a diagram illustrating a specific installation of a camera.

The camera 10, which is installed at a predetermined angle in a predetermined position in the rear of a vehicle, takes an image of surroundings at the rear of the vehicle through, for example, a fish-eye lens or a wide-angle lens. FIG. 2 illustrates a specific installation of the camera 10. Referring to FIG. 2, the camera 10 is installed in the middle of a rear bumper at an angle of 30 degrees downward from the horizontal. In this embodiment, a calibration sheet 200 is placed on the ground at the rear of the vehicle such that the calibration sheet is positioned within an image taking range of the camera 10.

Figure 3:
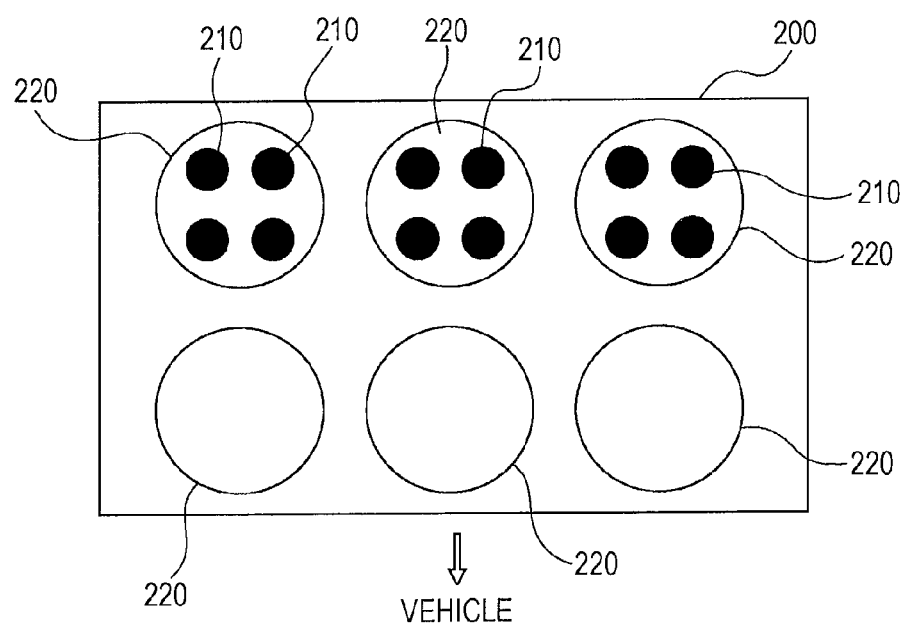
FIG. 3 is a diagram illustrating a specific example of a calibration sheet.

FIG. 3 illustrates a specific example of the calibration sheet 200. Referring to FIG. 3, the calibration sheet 200 includes, as calibration marks, twelve small black circles 210 and six large white circles 220. The large white circles 220 are arranged such that each of two rows includes three circles when viewed from the vehicle. The three large white circles 220, included in the row farther from the vehicle, each include four small black circles 210 arranged in an array of two columns by two rows. Each of the small black circles 210 and the large white circles 220 is identified on the basis of a captured image. The coordinates of the center of each circle are obtained and used for various calculations.

The image capturing unit 12 captures an image of the surroundings at the rear of the vehicle, the image being taken through the camera 10. The captured image is temporarily stored into the image memory 14. In this embodiment, while the calibration sheet 200 is placed in a predetermined position at the rear of the vehicle, the camera 10 takes a first image before movement of the vehicle and then takes a second image after forward movement of the vehicle by a predetermined distance.

The first image storing unit 20 reads the image, captured before movement of the vehicle and stored in the image memory 14, and stores the read image as a first image. The second image storing unit 22 reads the image, captured after movement of the vehicle and stored in the image memory 14, and stores the read image as a second image.

The first posture estimating unit 24 estimates the posture of the camera 10 on the basis of the first image stored in the first image storing unit 20 with reference to the positions of the calibration marks in the calibration sheet 200. Estimated values of the posture include camera position components $x_1$, $y_1$, and $z_1$ and camera angle components $rv_1$, $rh_1$, and $rr_1$. In this case, $x_1$ denotes an X coordinate, $y_1$ denotes a Y coordinate, $z_1$ denotes a Z coordinate, $rv_1$ denotes a pitch angle, $rh_1$ denotes a yaw angle, and $a_1$ denotes a roll angle. The X-axis direction and the Y-axis direction that are orthogonal to each other are defined on a plane parallel to the ground on which the calibration sheet 200 is placed. The Z-axis direction is defined perpendicular to the ground.

The second posture estimating unit 26 estimates the posture of the camera 10 on the basis of the second image stored in the second image storing unit 22 with reference to the positions of the calibration marks in the calibration sheet 200. Estimated values of the posture include camera position components x2, y2, and z2 and camera angle components rv2, rh2, and rr2. In this case, x2 and the other reference symbols denote the same meanings of x1 and the above-described other reference symbols, respectively.

The distance calculating unit 30 calculates a distance d of actual movement of the vehicle on the basis of the posture estimated values obtained by the first posture estimating unit 24 and those obtained by the second posture estimating unit 26.

The deviation calculating unit 32 calculates the amount of deviation of the calibration sheet 200 from a normal position (ideal design position or default position, which is assumed, fixed, or predetermined at the time of design or manufacture) on the basis of the posture estimated values obtained by the first posture estimating unit 24 and those obtained by the second posture estimating unit 26.

The camera posture determining unit 34 determines the posture of the camera 10 on the basis of the estimated values obtained by at least one of the first posture estimating unit 24 and the second posture estimating unit 26 and the deviation amount calculated by the deviation calculating unit 32.

The display processing unit 42 displays an image, taken by the camera 10, on the display 40 when the vehicle is moved. The auxiliary line creating unit 44 creates an auxiliary line, serving as a distance target upon movement of the vehicle. The display processing unit 42 displays the auxiliary line such that the line is superimposed on a taken image. The movement completion determining unit 46 determines the completion of movement of the vehicle by the predetermined distance.

The operation unit 50, which is configured to accept an operation instruction from a user, includes various keys. For example, second image capture by the image capturing unit 12 is based on a capture instruction issued from the operation unit 50 operated by the user.

The above-described first image storing unit 20 corresponds to first image storing means, the second image storing unit 22 corresponds to second image storing means, the first posture estimating unit 24 corresponds to first posture estimating means, the second posture estimating unit 26 corresponds to second posture estimating means, the deviation calculating unit 32 corresponds to sheet deviation calculating means, the camera posture determining unit 34 corresponds to camera posture determining means, the display processing unit 42 corresponds to display processing means, and the movement completion determining unit 46 corresponds to movement completion determining means.

The in-vehicle camera posture detecting apparatus 100 according to the embodiment has such a configuration. An operation of taking an image of the calibration sheet 200 through the camera 10 to determine the posture of the camera 10 will be described below.

Figure 4:
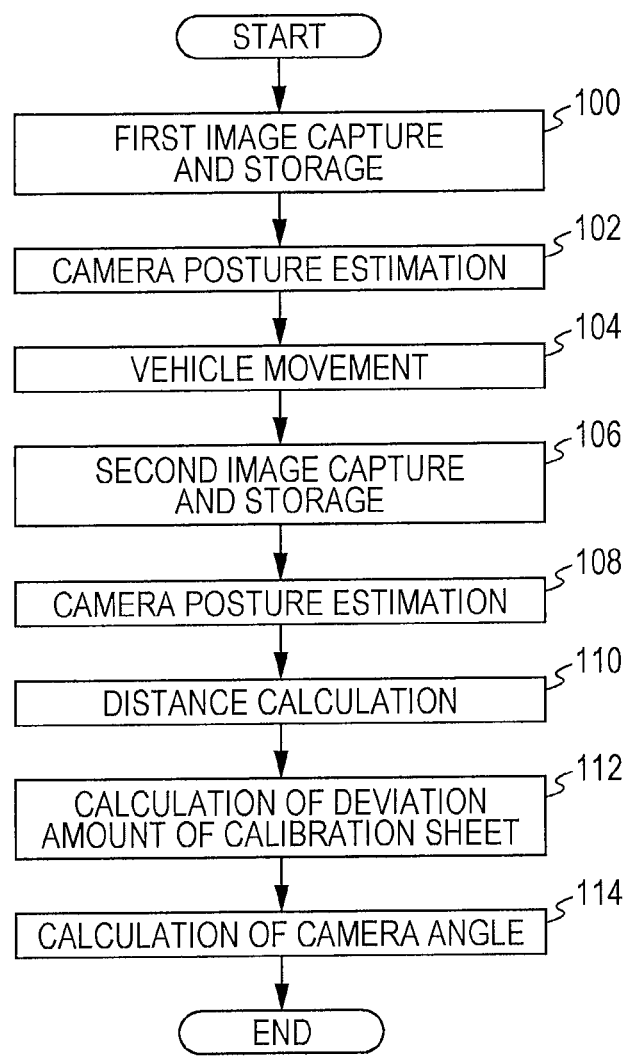
FIG. 4 is a flowchart of a schematic procedure for determining the posture of the camera.

FIG. 4 is a flowchart of a schematic procedure for determining the posture of the camera 10. While the calibration sheet 200 is placed in the predetermined position at the rear of the vehicle, the camera 10 takes a first image (step 100). Specifically, the user operates the operation unit 50 and gives an instruction for first image capture. The image capturing unit 12 captures the image taken by the camera 10 in accordance with the capture instruction and stores the image into the image memory 14. The first image storing unit 20 reads the image from the image memory 14 and stores the read image as a first image.

The first posture estimating unit 24 reads the first image from the first image storing unit 20 and estimates the posture of the camera 10 (step 102). Thus, the camera position components x1, y1, and z1 and the camera angle components rv1, rh1, and rr1 are obtained as estimated values of the posture of the camera 10.

The vehicle is moved by the predetermined distance (step 104). Specifically, the vehicle is moved straight forward by the predetermined distance. As for the predetermined distance, an assumed ideal value (for example, 20 cm) is used. If a distance slightly differs from the ideal value but is close to this value, no problems will arise.

Then, the camera 10 takes a second image (step 106). Specifically, the user operates the operation unit 50 and gives an instruction for second image capture. The image capturing unit 12 captures the image taken by the camera 10 in accordance with the capture instruction and stores the image into the image memory 14. The second image storing unit 22 reads the image from the image memory 14 and stores the read image as a second image.

The second posture estimating unit 26 reads the second image from the second image storing unit 22 and estimates the posture of the camera 10 (step 108). Thus, the camera position components x2, y2, and z2 and the camera angle components rv2, rh2, and rr2 are obtained as estimated values of the posture of the camera 10.

The distance calculating unit 30 calculates the distance d of movement of the vehicle on the basis of the two camera positions obtained by estimations in the above-described steps 102 and 108 (step 110). Specifically, the distance calculating unit 30 calculates the distance d using the camera position components x1 and y1 in the first estimation and the camera position components x2 and y2 in the second estimation by the following expression.

$$d=\sqrt{((x1-x2)^2+(y1-y2)^2)} \quad (1)$$

Figure 5:
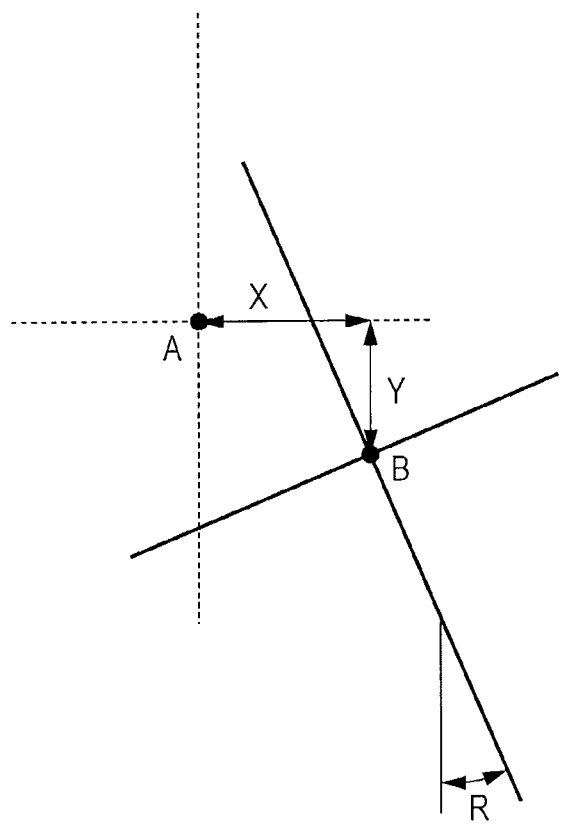
FIG. 5 is a diagram illustrating the relationship between three components of the amount of deviation.

The deviation calculating unit 32 calculates components X, Y, and R of the amount of deviation of the calibration sheet 200 from the design position (step 112). In this case, X denotes the deviation amount component in the X-axis direction, Y denotes the deviation amount component in the Y-axis direction, and R denotes the deviation amount component in the direction of rotation. FIG. 5 illustrates the relationship between the three deviation amount components X, Y, and R. Referring to FIG. 5, A indicates a point in the calibration sheet 200 placed in the design position and B indicates a corresponding point in the calibration sheet 200 placed actually.

Let x and y denote position components (hereinafter, referred to as "first design position components") of the camera 10 derived on the assumption that the calibration sheet 200 is placed in the design position before movement of the vehicle. Since the position in the Z-axis direction is constant irrespective of deviation of the calibration sheet 200, explanation of a position component z is omitted. The relationship between the position components x1 and y1 of the camera 10 estimated before movement of the vehicle and the first design position components x and y is expressed as follows.

$$\begin{bmatrix} x1 \\ y1 \end{bmatrix} = \begin{bmatrix} \cos R & -\sin R \\ \sin R & \cos R \end{bmatrix} \begin{bmatrix} x \\ y \end{bmatrix} + \begin{bmatrix} X \\ Y \end{bmatrix} \quad (2)$$

Similarly, let x' and y' denote position components (hereinafter, referred to as "second design position components") of the camera 10 derived on the assumption that the calibration sheet 200 is placed in the design position after movement of the vehicle. The relationship between the position components x2 and y2 of the camera 10 estimated after movement of the vehicle and the second design position components x' and y' is expressed as follows.

$$\begin{bmatrix} x2 \\ y2 \end{bmatrix} = \begin{bmatrix} \cos R & -\sin R \\ \sin R & \cos R \end{bmatrix} \begin{bmatrix} x' \\ y' \end{bmatrix} + \begin{bmatrix} X \\ Y \end{bmatrix} \quad (3)$$

When Expressions (2) and (3) are expanded, the following expression is obtained.

$$\begin{cases} x1 = x \cos R - y \sin R + X \\ y1 = x \sin R + y \cos R + Y \\ x2 = x' \cos R - y' \sin R + X \\ y2 = x' \sin R + y' \cos R + Y \end{cases} \quad (4)$$

Expression (4) is expressed as a determinant in terms of the deviation amount (X, Y, R) of the calibration sheet 200 as follows.

$$\begin{bmatrix} x & -y & 1 & 0 \\ y & x & 0 & 1 \\ x' & -y' & 1 & 0 \\ y' & x' & 0 & 1 \end{bmatrix} \begin{bmatrix} \cos R \\ \sin R \\ X \\ Y \end{bmatrix} = \begin{bmatrix} x1 \\ y1 \\ x2 \\ y2 \end{bmatrix} \quad (5)$$

Expression (5) is transformed as follows $$\begin{bmatrix} \cos R \\ \sin R \\ X \\ Y \end{bmatrix} = \begin{bmatrix} x & -y & 1 & 0 \\ y & x & 0 & 1 \\ x' & -y' & 1 & 0 \\ y' & x' & 0 & 1 \end{bmatrix}^{-1} \begin{bmatrix} x1 \\ y1 \\ x2 \\ y2 \end{bmatrix} \quad (6)$$

Assuming that the vehicle is moved in the Y-axis direction, the relationship between the first design position components x and y of the camera 10 and the second design position components x' and y' is expressed as follows.

$$x' = x$$

$$y' = y + d \quad (7)$$

All of the values in the right sides of Expression (6) are known. The deviation calculating unit 32 can calculate the deviation amount components X, Y, and R using Expression (6).

The camera posture determining unit 34 calculates the angle components rv (pitch angle), rh (yaw angle), and a (roll angle) of the camera 10 which are unknown values (step 114). The relationship among the actual angle components rv, rh, and a of the camera 10, the estimated values rv1, rh1, and rr1, and the deviation amount component R of the calibration sheet 200 can be expressed as follows:

$$Ry(R) \cdot Rx(rv) \cdot Ry(rh) \cdot Rz(rr) = Rx(rv1) \cdot Ry(rr1) \cdot Rz(rh1) \quad (8)$$

where Rx(rv), Ry(rh), and Rz(rr) are the following rotation matrices.

$$Rx(rv) = \begin{bmatrix} 1 & 0 & 0 \\ 0 & \cos(rv) & -\sin(rv) \\ 0 & \sin(rv) & \cos(rv) \end{bmatrix} \quad (9)$$

$$Ry(rh) = \begin{bmatrix} \cos(rh) & 0 & \sin(rh) \\ 0 & 1 & 0 \\ -\sin(rh) & 0 & \cos(rh) \end{bmatrix} \quad (10)$$

$$Rz(rr) = \begin{bmatrix} \cos(rr) & -\sin(rr) & 0 \\ \sin(rr) & \cos(rr) & 0 \\ 0 & 0 & 1 \end{bmatrix} \quad (11)$$

Expression (8) is transformed as follows.

$$Rx(rv) \cdot Ry(rh) \cdot Rz(rr) = Ry(-R) \cdot Rx(rv1) \cdot Ry(rh1) \cdot Rz(rr1) \quad (12)$$

Since all of the values in the right side of Expression (12) are known, the expression is expanded as follows.

Furthermore, the left side of Expression (12) is expanded and is then solved together with Expression (13) as follows.

$$rv = \tan^{-1}\left(-\frac{R12}{R22}\right) \quad (14)$$

$$rh = \sin^{-1}(R02)$$

$$rr = \tan^{-1}\left(-\frac{R01}{R00}\right)$$

The camera posture determining unit 34 calculates the angle components rv, rh, and a of the camera 10 in the above-described manner.

Camera posture estimating operations of the first and second posture estimating units 24 and 26 will now be described. Since the first and second posture estimating units 24 and 26 have the same configuration, the first posture estimating unit 24 will be described in detail below.

Figure 6:
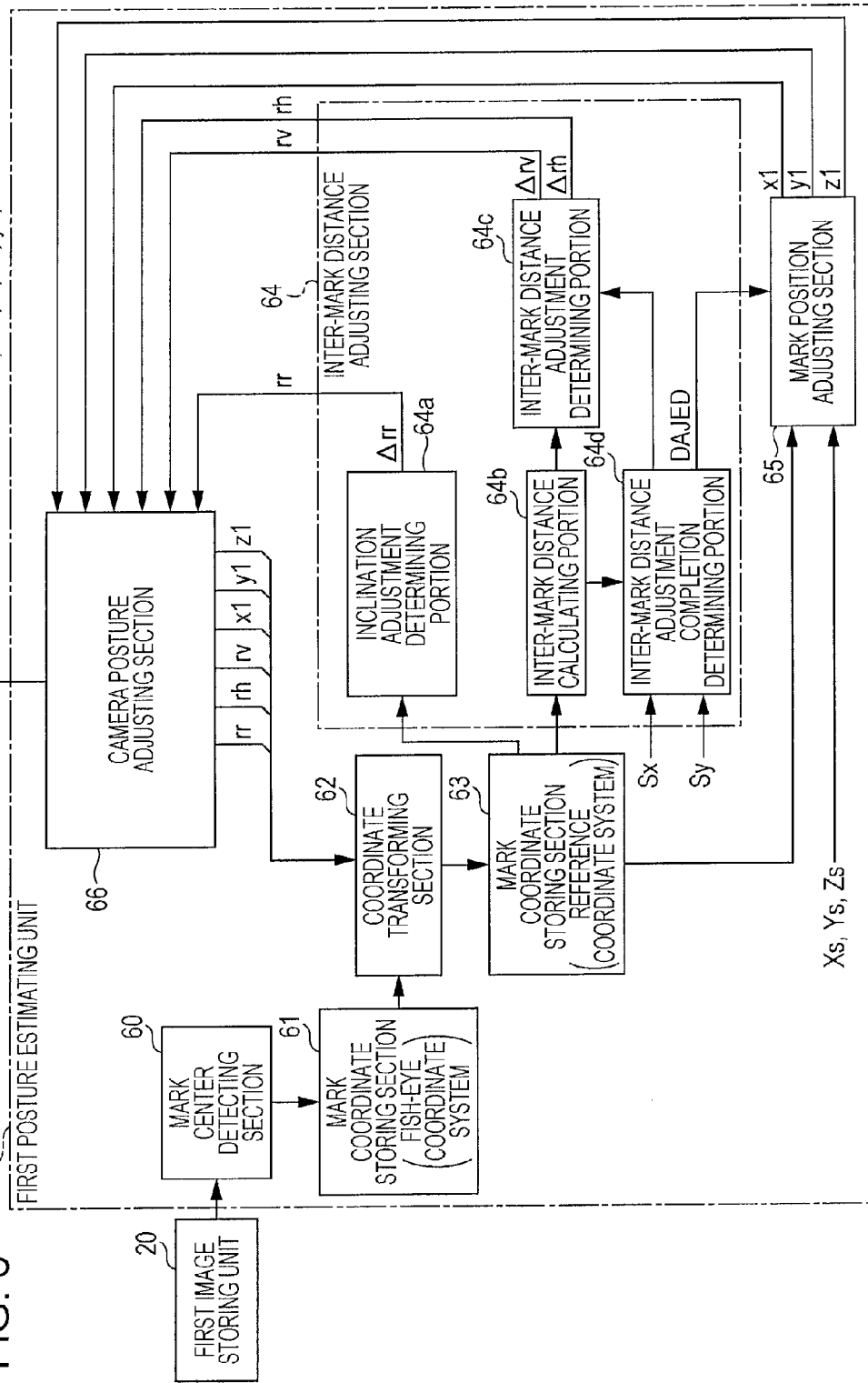
FIG. 6 is a block diagram of the detailed configuration of a first posture estimating unit.

FIG. 6 illustrates the detailed configuration of the first posture estimating unit 24. Referring to FIG. 6, the first posture estimating unit 24 includes a mark center detecting section 60, mark coordinate storing sections 61 and 63, a coordinate transforming section 62, an inter-mark distance adjusting section 64, a mark position adjusting section 65, and a camera posture adjusting section 66.

The mark center detecting section 60 reads the first image stored in the first image storing unit 20 and detects the center of each calibration mark in the calibration sheet 200 included in the first image. For example, the mark center detecting section 60 extracts the twelve small black circles 210, serving as the calibration marks included in the calibration sheet 200, by image recognition and then stores the coordinates of the center of each circle into the mark coordinate storing section 61. The coordinates of the center are represented in the fish-eye coordinate system in which an image plane (U-V coordinate system) is defined perpendicular to the optical axis, indicated by S, of the camera 10.

The coordinate transforming section 62 transforms the coordinates of the center of each calibration mark in the fish-eye coordinate system into those in the reference coordinate system in which the ground extends in the X-Y plane and the Z-axis direction is perpendicular to the ground, and stores the transformed coordinates into the mark coordinate storing section 63.

Figure 7A:
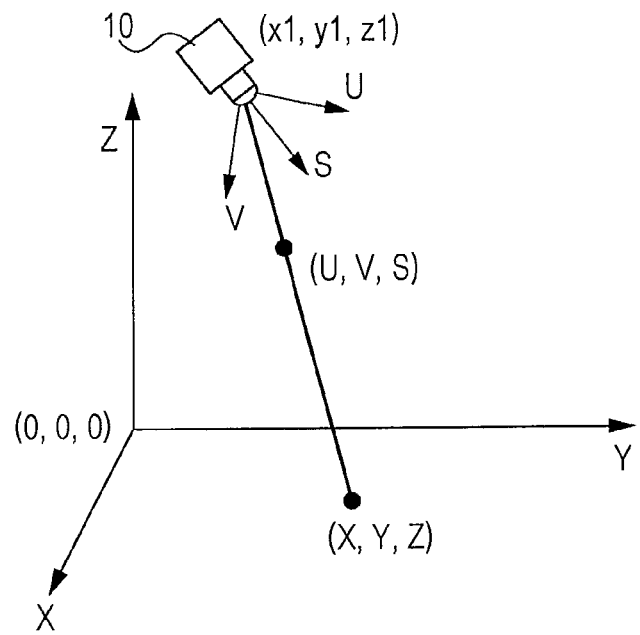
FIGS. 7A and 7B are diagrams explaining coordinate transformation.
Figure 7B:
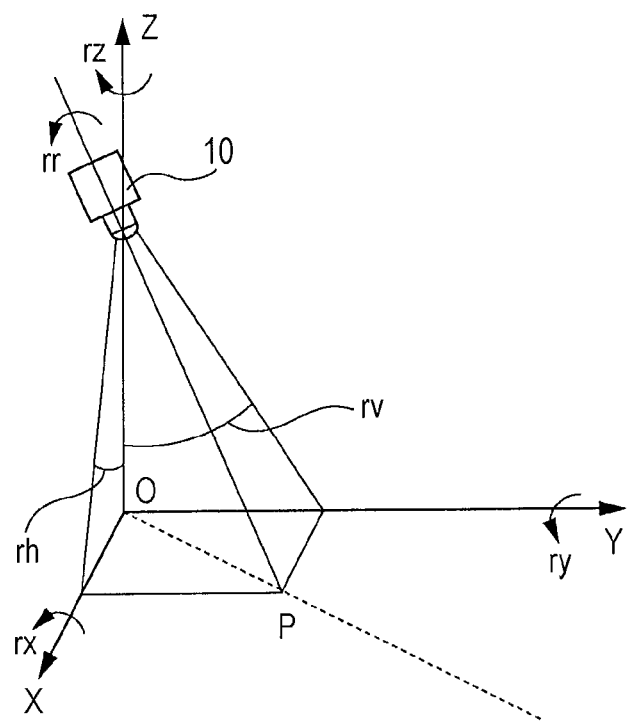

FIGS. 7A and 7B are diagrams explaining coordinate transformation. Referring to FIGS. 7A and 7B, X-Y-Z represents the reference coordinate system and U-V-S represents the fish-eye coordinate system. In FIGS. 7A and 7B, when x1, y1, and z1 denote components of the distance between the origin of the fish-eye coordinate system U-V-S and that of the reference coordinate system X-Y-Z and let rx, ry, and rz denote components of the amount of rotation of the camera 10 around the respective axes of the reference coordinate system X-Y-Z, the following expression holds. Note that coordinates u, v, and s of the center of the calibration mark in the fish-eye coordinate system are known values and a coefficient X, is used to transform a unit in the reference coordinate system into millimeters on the basis of the actual distance between adjacent calibration marks.

$$\begin{bmatrix} X \\ Y \\ Z \end{bmatrix} = \begin{bmatrix} \cos(rz) & -\sin(rz) & 0 \\ \sin(rz) & \cos(rz) & 0 \\ 0 & 0 & 1 \end{bmatrix} \begin{bmatrix} \cos(ry) & 0 & \sin(ry) \\ 0 & 1 & 0 \\ -\sin(ry) & 0 & \cos(ry) \end{bmatrix} \times \begin{bmatrix} 1 & 0 & 0 \\ 0 & \cos(rx) & -\sin(rx) \\ 0 & \sin(rx) & \cos(rx) \end{bmatrix} \times \begin{bmatrix} \lambda \times u \\ \lambda \times v \\ \lambda \times s \end{bmatrix} + \begin{bmatrix} x1 \\ y1 \\ z1 \end{bmatrix} \quad (15)$$

Referring to FIG. 7B, when the optical axis of the camera 10 points a point P on the X-Y plane, the amount of rotation around the X axis is ry (=rx), that around the Y axis is rh (=ry), and that around the Z axis is a (=rz). These rotation amounts correspond to a pitch angle, a yaw angle, and a roll angle, respectively.

After that, the inter-mark distance adjusting section 64, the mark position adjusting section 65, and the camera posture adjusting section 66 determine the values rv, rh, rr, x1, y1, and z1 such that each distance between the adjacent calibration marks in each axis direction is equal to the actual distance therebetween in the axis direction and the position of each calibration mark coincides with the actual position thereof. Specifically, the inter-mark distance adjusting section 64 and the camera posture adjusting section 66 calculate the coordinates of the center of each calibration mark using Expression (15) while changing the values rv, rh, and a without changing the values x1, y1, and z1. Then, the sections 64 and 66 calculate each distance between the adjacent calibration marks in each axis direction to obtain the values rv, rh, and a at which the distances between the adjacent calibration marks in each axis direction are equal to one another, and output the values rv, rh, and rr as camera angle components. In addition, the mark position adjusting section 65 and the camera posture adjusting section 66 calculate the coordinates of the center of each calibration mark using Expression (15) to obtain the values x1, y1, and z1 at which the center coincides with the actual center (which is known) of the calibration mark, and then output the values as camera position components.

Specifically, changing the value rr enables adjustment of inclination of the calibration marks, changing the value rh enables adjustment of the distances between the adjacent calibration marks in the vertical direction, and changing the value ry enables adjustment of the distances between the adjacent calibration marks in the horizontal direction.

First, therefore, an inclination adjustment determining portion 64a calculates the angle of inclination of the calibration marks using the coordinates of the centers of the calibration marks when the values x1, y1, and z1 are constant (for example, zero). In the case where the arrangement of the calibration marks is inclined, the inclination adjustment determining portion 64a adjusts the value rr such that the inclination angle is equal to 0 and inputs an adjustment amount Δrr to the camera posture adjusting section 66. The camera posture adjusting section 66 calculates a new value a on the basis of rr=rr+Δrr and inputs the calculated value to the coordinate transforming section 62. The coordinate transforming section 62 calculates the coordinates of the center of each calibration mark using Expression (15). The inclination adjustment determining portion 64a calculates the inclination angle of the calibration marks using the coordinates of the centers of the calibration marks. The above-described processes are continued to adjust the value a until the inclination angle of the calibration marks is equal to 0.

On completion of the adjustment of the value a such that the inclination angle of the calibration marks is equal to 0, an inter-mark distance calculating portion 64b calculates the distances between the adjacent calibration marks in the X-axis direction. An inter-mark distance adjustment completion determining portion 64d determines whether the distances between the adjacent calibration marks are equal to one another. If the distances therebetween are not equal to one another, the inter-mark distance adjustment completion determining portion 64d supplies an adjustment instruction signal to an inter-mark distance adjustment determining portion 64c. Accordingly, the inter-mark distance adjustment determining portion 64c adjusts the value rh and inputs an adjustment amount Δrh to the camera posture adjusting section 66. The camera posture adjusting section 66 calculates a new value rh on the basis of rh=rh+Δrh and inputs the calculated value to the coordinate transforming section 62. The coordinate transforming section 62 calculates the coordinates of the center of each calibration mark using Expression (15). The inter-mark distance calculating portion 64b calculates the distances between the adjacent calibration marks in the X-axis direction on the basis of the coordinates of the centers of the calibration marks. The value rh is adjusted until the distances between the adjacent calibration marks in the X-axis direction are equal to one another.

On completion of the adjustment of the value rh, the inter-mark distance calculating portion 64b calculates the distances between the adjacent calibration marks in the Y-axis direction. The inter-mark distance adjustment completion determining portion 64d determines whether the distances between the adjacent calibration marks in the Y-axis direction are equal to one another. If the distances therebetween are not equal to one another, the inter-mark distance adjustment completion determining portion 64d supplies an adjustment instruction signal to the inter-mark distance adjustment determining portion 64c. Accordingly, the inter-mark distance adjustment determining portion 64c adjusts the value ry and inputs an adjustment amount Δrv to the camera posture adjusting section 66. The camera posture adjusting section 66 calculates a new value ry on the basis of rv=rv+Δrv and inputs the calculated value to the coordinate transforming section 62. The coordinate transforming section 62 calculates the coordinates of the center of each calibration mark using Expression (15). The inter-mark distance calculating portion 64b calculates the distances between the adjacent calibration marks in the Y-axis direction on the basis of the coordinates of the centers of the calibration marks. The value ry is adjusted until the distances between the adjacent calibration marks in the Y-axis direction are equal to one another.

On completion of the adjustment of the values ry (=rv1), rh (=rh1), and a (=rr1) in the above-described manner, the inter-mark distance adjustment completion determining portion 64d outputs an installation angle adjustment completion signal DAJED.

The mark position adjusting section 65 obtains the values x1 and y1 at which the center of each calibration mark coincides with the actual center (Xs, Ys) using Expression (15) in response to the installation angle adjustment completion signal DAJED. In addition, the mark position adjusting section 65 adjusts the value z1 such that the size of each calibration mark (or each distance between the adjacent calibration marks) coincides with the actual one, and outputs the values x1, y1, and z1 as camera position components. After that, the camera posture adjusting section 66 outputs the calculated camera angle components rv1, rh1, and a1 and camera position components x1, y1, and z1 from the first posture estimating unit 24.

As described above, the in-vehicle camera posture detecting apparatus 100 according to the embodiment calculates the deviation amount of the calibration sheet 200 from the predetermined position (design position) on the basis of the images captured before and after movement of the vehicle. The effect of the deviation of the calibration sheet 200 can therefore be eliminated. The posture of the camera 10 can be accurately detected.

Furthermore, since the predetermined distance d by which the vehicle is moved is determined on the basis of the estimated values obtained by the first and second posture estimating units 24 and 26, the distance d can be accurately grasped. Advantageously, an error of estimation of the camera posture based on the second image captured after movement can be reduced.

In step 104 of FIG. 4, the vehicle is moved by the predetermined distance. In order to approach the distance of movement to the ideal value (design value), it is preferable to inform a driver of the completion of movement of the vehicle by the predetermined distance in some way.

FIG. 8 is a flowchart of a procedure for providing a notification when the vehicle is moved by the predetermined distance according to a modification of the embodiment. The display processing unit 42 displays an image (check image) taken through the camera 10 on a screen of the display 40 (step 200) prior to movement of the vehicle (step 104 of FIG. 4). In addition, the auxiliary line creating unit 44 creates an auxiliary line to be superimposed on the image displayed in step 200 (step 202). This auxiliary line is displayed so as to be superimposed on the check image by the display processing unit 42.

Figure 9A:
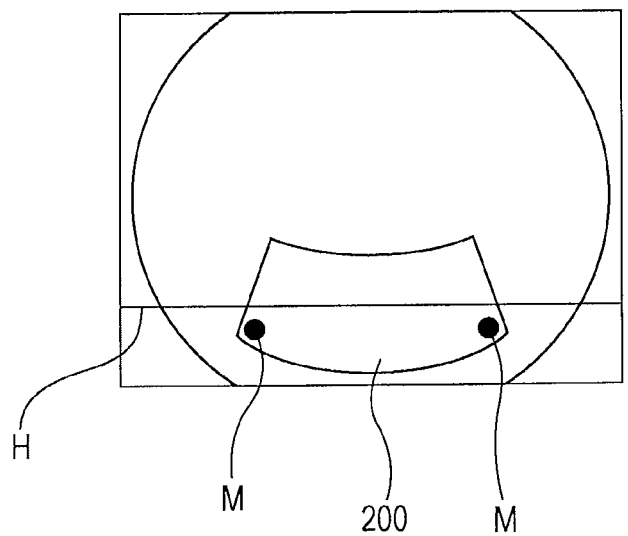
FIGS. 9A and 9B are diagrams illustrating specific examples of check images displayed before and after movement of the vehicle.
Figure 9B:
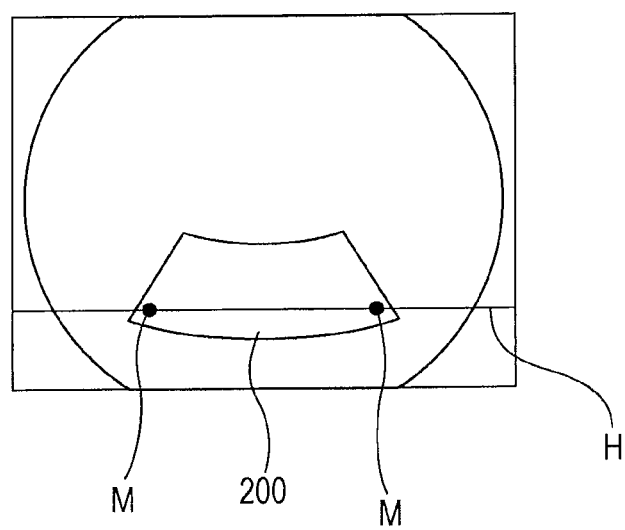

FIGS. 9A and 9B illustrate specific examples of check images displayed before and after movement of the vehicle. FIG. 9A illustrates the image before movement and FIG. 9B illustrates the image after movement. In FIGS. 9A and 9B, markers M are arranged at corners of the calibration sheet 200 adjacent to the vehicle. The markers M may be actually included in the calibration sheet 200 such that each marker has a specific color or shape. Alternatively, the auxiliary line creating unit 44 may recognize the corners of the calibration sheet 200 and create the markers M as images to be superimposed. In addition, the auxiliary line creating unit 44 creates an auxiliary line H which is positioned at a distance above the markers M. This arrangement means that the auxiliary line H is located in an area at the rear of the markers M. The predetermined distance has to correspond to a length that is equal to a vehicle movement distance extending along the ground. After the positions of the markers M are determined, the position spaced apart from the markers M by the predetermined distance can be calculated. This position may be calculated on the basis of estimation (camera angle components) by the first posture estimating unit 24.

After such an image is displayed, the vehicle is moved (step 204). As the vehicle is moved, the position of the calibration sheet 200 included in the displayed image is moved upward (backward) but the position of the auxiliary line H illustrated in FIG. 9A is fixed in the screen.

Simultaneously with the movement of the vehicle, the movement completion determining unit 46 determines whether the markers M in the calibration sheet 200, moved upward (backward) in the screen, coincide with or have passed the auxiliary line H (step 206). If the markers M do not coincide with or have not yet passed the auxiliary line H, the movement completion determining unit 46 determines "NO" and the determination in this step is repeated.

If the markers M coincide with or have passed the auxiliary line H, namely, the vehicle has been moved by the predetermined distance, the movement completion determining unit 46 determines "YES" in step 206. FIG. 9B illustrates a state in which the markers M coincide with the auxiliary line H. The movement completion determining unit 46 then provides a notification indicating that the vehicle movement is completed (step 208). For example, the movement completion determining unit 46 permits the display processing unit 42 to display a message indicating the completion of movement on the display 40. Alternatively, a voice message or alarm indicating the completion of movement may be output from a speaker or buzzer. When receiving the notification, the driver stops moving the vehicle (step 210).

As described above, according to the in-vehicle camera posture detecting apparatus 100 of the present embodiment, the driver can recognize the physical relationship between the markers M and the auxiliary line H while viewing the check images displayed on the display 40. Advantageously, the driver can readily determine a distance by which the vehicle is to be moved. Since the markers and the auxiliary line may be included in the check image or a notification may be provided on completion of the movement by the predetermined distance, the driver can be reliably informed of the completion of movement of the vehicle by the predetermined distance. Advantageously, this prevents a distance of movement of the vehicle from becoming longer than necessary.

It is to be understood that the present invention is not limited to the above-described embodiment and various changes and modifications can be made without departing from the spirit and scope of the invention. For example, in the above-described embodiment, the first image storing unit 20 and the second image storing unit 22 are separated and the first posture estimating unit 24 and the second posture estimating unit 26 are separated. The first and second units 20 and 22 fundamentally perform the same process and the first and second units 24 and 26 also fundamentally perform the same process. Accordingly, one of the first and second units may be omitted and the other unit may repeat the same process.

Furthermore, the above-described embodiment has been described with respect to the camera 10 that takes an image of surroundings at the rear of a vehicle. The present invention is applicable to determination of the posture of a camera that takes an image of surroundings in front of or at a side of a vehicle.

According to the present invention, since the amount of deviation of the calibration sheet 200 from the predetermined position (design position) is calculated on the basis of images before and after movement of the vehicle as described above, the effect of the deviation of the calibration sheet 200 can be eliminated. Thus, the posture of the camera 10 can be accurately detected.

Although preferred embodiments have been described in detail, the present invention is not limited to these specific embodiments. Rather, various modifications and changes can be made without departing from the scope of the present invention as described in the accompanying claims. Accordingly, all such modifications are intended to be included within the scope of this invention as defined in the following claims.

What is claimed is:

1. An in-vehicle camera posture detecting apparatus for detecting a positional alignment of a camera mounted on a vehicle, the apparatus comprising:
   a first image storing unit configured to store, as a first image, an image of a calibration sheet placed in a predetermined position relative to the vehicle and captured by the camera, the calibration sheet having a plurality of calibration marks thereon having a predetermined configuration relative to one another;
   a first posture estimating unit configured to estimate the posture of the camera based on the first image;
   a second image storing unit configured to store, as a second image, an image of the calibration sheet captured by the camera after movement of the vehicle by a distance;
   a second posture estimating unit configured to estimate the posture of the camera based on the second image;
   a distance calculating unit configured to calculate the distance;
   a sheet deviation calculating unit configured to calculate an amount of deviation of the calibration sheet from the predetermined position of the calibration sheet relative to the vehicle based on the estimates provided by the first posture estimating unit, the second posture estimating unit, and the distance; and
   a camera posture determining unit configured to determine the posture of the camera based on a posture estimated value obtained by at least one of the first and second posture estimating units and the calculated amount of deviation.

2. The apparatus according to claim 1, wherein the distance calculating unit calculates the distance based on the posture estimated values obtained by the first and second posture estimating units.

3. The apparatus according to claim 1, wherein the camera is installed in a default position and the sheet deviation calculating unit is configured to calculate the deviation amount based on the relationship between the default position of the camera, the estimations by the first and second posture estimating units, and the deviation amount of the calibration sheet from the predetermined position.

4. The apparatus according to claim 1, wherein the camera posture determining unit is configured to determine an actual camera angle based on the relationship between camera angles estimated by the first and second posture estimating units, and a component in a direction of rotation of the deviation amount of the calibration sheet calculated by the sheet deviation calculating unit.

5. The apparatus according to claim 1, wherein the camera posture determining unit determines the posture of the camera based on a posture estimated value obtained by the first posture estimating unit.

6. The apparatus according to claim 1, wherein the vehicle is moved in a straight line.

7. The apparatus according to claim 1, further comprising:
   a display processing unit configured to display a check image on a display, the check image used to determine whether the vehicle has been moved by a predetermined distance.

8. The apparatus according to claim 7,
   wherein the check image includes a marker that moves in the check image as the vehicle is moved, and an auxiliary line having a display position fixed in the check image, and
   wherein the check image is displayed such that the marker coincides with the auxiliary line when the movement of the vehicle by the predetermined distance is completed.

9. The apparatus according to claim 1, further comprising:
   a movement completion determining unit that determines based on images captured by the camera whether the movement of the vehicle by a predetermined distance is completed, and provides a notification on completion of the movement.

10. A method for detecting the posture of a camera mounted on a vehicle, the method comprising:
    estimating, by first posture estimating component, the posture of the camera based on an image of a calibration sheet placed in a predetermined position relative to the vehicle and captured by the camera, the calibration sheet having a plurality of calibration marks thereon having a predetermined configuration relative to one another;
    estimating, by second posture estimating component, the posture of the camera based on an image of the calibration sheet captured by the camera after movement of the vehicle by a distance;
    calculating, by a distance calculating component, the distance;
    calculating, by a sheet deviation calculating component, an amount of deviation of the calibration sheet from the predetermined position of the calibration sheet relative to the vehicle based on estimations by the first posture estimating component, the second posture estimating component, and the distance; and
    determining, by the camera posture determining component, the posture of the camera based on a posture estimated value obtained by at least one of the first and second posture estimating components and the deviation amount calculated by the sheet deviation calculating component.

11. An in-vehicle camera apparatus configured to detect a posture of a camera mounted on a vehicle, the apparatus comprising:
    a first image storing unit configured to store a calibration sheet image captured when a calibration sheet is placed at a predetermined location relative to the vehicle, the calibration sheet having a plurality of calibration marks thereon having a predetermined configuration relative to one another;
    a first posture estimating unit configured to estimate the posture of the camera based on the calibration sheet image;
    a second image storing unit configured to store a displaced calibration sheet image after the vehicle has moved by a distance relative to the calibration sheet;
    a second posture estimating unit configured to estimate the posture of the camera based on the displaced calibration sheet image;
    a distance calculating unit configured to calculate the distance;
    a sheet deviation calculating unit configured to calculate an amount of deviation of the calibration sheet from the predetermined position of the calibration sheet relative to the vehicle based on the estimates provided by the first posture estimating unit, the second posture estimating unit, and the distance; and
    a camera posture determining unit configured to determine the posture of the camera based on a posture estimated value obtained by at least one of the first and second posture estimating units and the calculated amount of deviation.

* * * * *